Nov. 3, 1964
M. T. SIMNAD
3,154,845
METHOD OF FABRICATING A FUEL ELEMENT
Filed Feb. 8, 1962
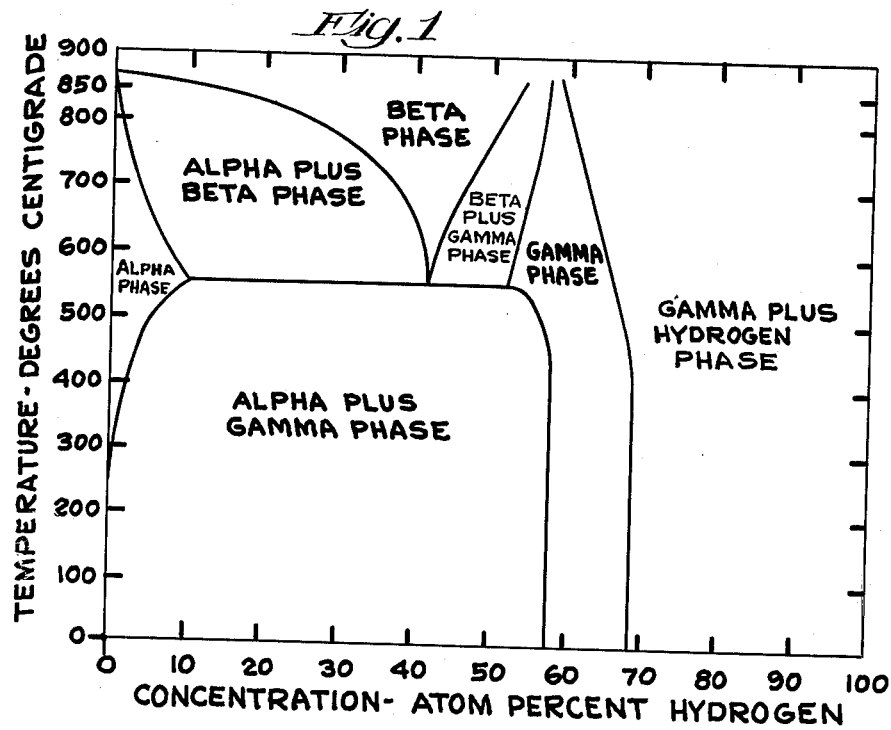
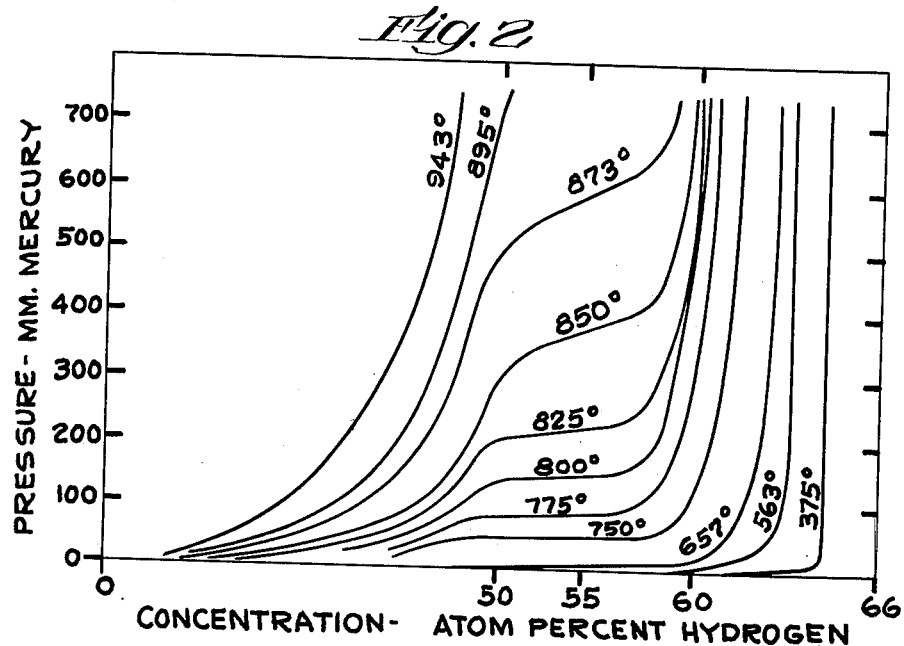
Inventor:
Massoud T. Simnad
By Soons, Anderson, Luedeka & Vitch
Attys.

United States Patent Office 3,154,845
Patented Nov. 3, 1964

3,154,845
METHOD OF FABRICATING A FUEL ELEMENT
Massoud T. Simnad, San Diego, Calif., assignor to General Dynamics Corporation, New York, N.Y., a corporation of Delaware
Filed Feb. 8, 1962, Ser. No. 171,962
8 Claims. (Cl. 29—470)

The present invention generally relates to fuel elements and more particularly relates to an improved method of fabricating fuel elements for a nuclear reactor.

Metal clad fuel elements for nuclear reactors have been used with considerable success. A wide variety of types of such fuel elements have been fabricated. In one particular type of such metal clad fuel elements, the nuclear fuel is combined with or dispersed in or mixed with a suitable moderator in the form of a hydride. The fuel-hydride mixture is formed into a fuel compact or slug, then suitably dimensioned and fitted into a metal can. It is important that the fuel slug fit tightly within the cladding so that there is maximum efficiency of heat transfer from the fuel slug through the cladding to the coolant external of the fuel element within the nuclear reactor core.

Some difficulties have been encountered in the fabrication of the described type of fuel element. In this connection, the nuclear fuel-hydride mixture, preferably in alloy form, is frequently difficult to work. Thus, it requires final machining to small tolerances in order to fit snugly within the can. A particularly advantageous hydride for use in the fuel element is zirconium hydride which, however, is difficult to machine, with or without accompanying nuclear fuel such as uranium. Such machining normally creates a fire hazard in the filters and other auxiliary equipment for the machining operation. Moreover, machining of the alloy or other combination of nuclear fuel and zirconium hydride normally leads to some loss of the relatively expensive fuel-hydride mixture. Nevertheless, successful, though relatively expensive, machining operations have been carried out on such fuel slugs in the production of successfully operating fuel elements of the type described. Inasmuch as it is usually difficult to obtain a relatively tight fit between the can wall and the machined fuel slug, an additional processing step is usually required, which comprises passing the canned fuel through drawings equipment and drawing the cladding tightly around the fuel. This extra processing step increases the processing time and cost for production of the canned slugs.

There has now been discovered an improved method of fabricating a fuel element containing a nuclear fuel-metal hydride slug or compact disposed within a tightly fitting suitable metal can. The finished fuel element is suitable for use in nuclear reactors of the type known in the art as TRIGA reactors, and also other nuclear reactors. The improved method of the present invention eliminates the necessity of machining a hydride moderator-containing fuel slug to critical tolerances and also eliminates the necessity of carrying out a drawing operation on the canned slug in order to obtain a tight fit between the slug and can. Instead, a simplified procedure is carried out which results in an even tighter, more uniformly controlled fit between the fuel slug and can, with resultant improvement in the efficiency of heat transfer from the fuel slug through the metal can to the reactor coolant.

Accordingly, it is the primary object of the present invention to provide an improved method of fabricating a fuel element for a nuclear reactor. It is also an object of the present invention to provide an improved method of fabricating a metal clad, hydride-containing fuel element for a nuclear reactor. It is a further object of the present invention to provide an improved method of fabricating a fuel element which comprises a nuclear fuel-and metal hydride-containing fuel slug with metal cladding tightly fitting around the fuel slug. It is also an object of the present invention to provide a simplified method of fabricating a metal clad hydride-containing fuel element, which method results in improved heat transfer from the fuel to an external coolant. It is a further object of the present invention to provide a method of fabricating a fuel element, which method eliminates machining of the fuel slug before canning. Further objects and advantages of the present invention are set forth in the following detailed description and in the accompanying drawings of which:

FIGURE 1 is a graph plotting hydrogen concentration against temperature in a hydrogen-zirconium system; and
FIGURE 2 is a graph plotting hydrogen concentration against hydrogen pressure for the same system as that of FIGURE 1.

The process of the present invention generally comprises fabricating a metal-clad nuclear-fuel containing fuel slug which includes a metal hydride moderator by hydriding a hydride-yielding component to form the moderator in situ in the fuel mixture after the fuel slug is at least partially canned, i.e., clad.

More particularly, a nuclear fuel body is formed by any suitable procedure from a mixture of nuclear fuel and a hydride-forming metal or metal alloy. It is then shaped and inserted and at least partially enclosed within a can of high temperature metal. Depending upon the particular technique employed, the can may or may not then be swaged, as hereinafter more particularly described. Thereupon, the hydride-forming metal is subjected to hydriding. The metal of the can or cladding is such that at the hydriding temperature it is permeable to hydrogen gas, allowing the hydriding to proceed in situ in the can without injury to the metal cladding.

Now referring more specifically to the steps of the present method, a mixture is formed of nuclear fuel and a metal or alloy which when hydrided is a suitable moderator for the nuclear fuel. The mixture may be an alloy of the fuel and hydride-forming metal or a sintered compact, etc.

The nuclear fuel for the purposes of the present invention can comprise any nuclear fuel suitable for use in a nuclear reactor, or a mixture of such nuclear fuels, for example, thorium 232 or uranium 238 unenriched or suitably enriched with uranium 235 (for example, 7 to 20 percent by weight of uranium 235), etc.

The hydride-forming metal of the mixture comprises zirconium, which when hydrided forms a superior moderator. Zirconium readily alloys with the nuclear fuel to form a solid fuel slug. However, other suitable hydride-forming metals which in a hydrided state serve as suitable high temperature moderators for the nuclear fuel can be used. Such metal may be present in any suitable concentration in the mixture, for example, 10 to 95 percent, by weight, depending on the requirements for the particular nuclear reactor in which the fuel element is to be utilized.

The procedure by which the hydride-forming metal and nuclear fuel mixture is formed into a fuel slug is preferably an alloying and casting procedure. As an example, a 92 percent zirconium-8 percent uranium 238 mixture enriched with 20 percent, by weight, of uranium 235 can be suitably formed into a fuel body for use in a fuel element of the present invention by initially providing both the zirconium and the uranium in powdered form, mixing, heating to an alloying temperature, and casting in a suitable casting mold.

The solidified product may be in any suitable form, such as a solid or hollow rod, cylinder or the like of suitable size. If desired, the mixture of zirconium and uranium can be compacted by pressing, and can then be sintered to form the fuel slug. In order to facilitate the subsequent hydriding steps, it has been found desirable that the fuel slug thus produced not have a larger wall thickness than approximately 3/8 inch. If the overall slug diameter is to be greater than 3/8 inch thick, the fuel body can be fabricated with a hollow center, to limit the wall thickness to the indicated 3/8 inch maximum. Thus, it has been found that hydriding proceeds, in accordance with the present invention, much more rapidly and effectively with less danger of cracking of the fuel slug if carried out on relatively thin walled pieces, for example, not over 3/8 inch thick. However, the present invention is not limited to the use of fuel bodies having any specific wall thickness. If carefully carried out, the hydriding can be successfully accomplished with pieces thicker than about 3/8 inch. However, for most purposes, fuel slugs having wall thicknesses of not more than from about 3/8 to about 1/2 inch are suitable.

A particular application for the fuel element prepared in accordance with the present invention is in a TRIGA type nuclear reactor, such as is more fully described in United States Patent Nos. 3,127,325 and 3,120,471. Such neutronic reactors as the TRIGA operate with liquid coolant, for example, water, and at fuel element temperatures up to about 300° C.

It is important in selecting the fuel element cladding or canning material to select a metal which has a suitable high temperature melting point and which has suitable structural stability and durability at the contemplated operating temperature for the reactor in which the fuel elements are to be disposed. It is also important in regarding the type of metal which is to be used in the cladding or canning to select a metal which has a melting or softening point well above the contemplated hydriding temperature. In this connection, it has been found preferable to use stainless steel, chrome steel or the like metal or metal alloy which has suitable structural stability and which has a melting point substantially above hydriding temperatures in the range of from about 700° C. to 900° C.

As more fully described hereinafter, the hydriding temperature can vary considerably, in accordance with the particular hydriding technique, such as those specified in United States Patent Nos. 3,070,526 and 3,135,697. However, the usual hydriding temperatures will be in the indicated 700° C. to 900° C. range.

Chrome steel and stainless steels of various compositions have been found to be particulraly suitable as the canning material in view of their high melting points, high strengths, etc. Moreover, each is permeable to hydrogen in the range of from about 700° C. to about 900° C., so that hydriding of the fuel slug enclosed within a can fabricated of such canning material can effectively be carried out.

As an example, the can may be fabricated in the form of a hollow sleeve, for example, 20 mil in thickness, from type 304 18-8 austenitic stainless steel containing approximately 18 percent chromium and 8 percent nickel. In accordance with the method of the present invention, the fuel slug can be slipped in place within the stainless steel sleeve. The canned fuel slug can then be hydrided with the ends of the can open, or can be then fitted with a bottom end cap and a top end cap of the same cladding material, which are then welded in place. One technique in accordance with the method of the present invention calls for swaging of the canned slug before hydriding. At any rate, the sleeve is of such diameter with respect to the fuel slug to provide a small clearance between the fuel body and the wall of the sleeve before hydriding.

The hydriding operation subsequently carried out results, due to absorption of hydrogen, in some expansion of the fuel slug to bring about the desired tight fit between the fuel slug and sleeve. The permissible initial clearance between the fuel slug and sleeve will depend upon the degree of hydriding to be carried out and other factors. For most purposes, a 5 to 10 mil clearance between the fuel body and the container before hydriding is preferred. It is sufficiently small so that when the fuel slug is hydrided, in situ within the sleeve, an interference fit will result between the hydrided fuel slug and the sleeve.

After the canning operation with or without swaging the unhydrided fuel slug within the metal can or sleeve is hydrided preferably in accordance with the methods set forth, in United States Patents Nos. 3,070,526 and 3,135,697.

Whatever the particular technique employed to carry out the method of the present invention, the fuel slug containing zirconium metal and metal nuclear fuel, i.e., uranium, thorium, etc., in admixture, as an alloy, etc., if not already free or substantially free of contaminants which hamper the diffusion of hydrogen into the zirconium, i.e., zirconium oxide, etc., is cleaned before canning. The cleaning can be accomplished with a suitable agent, for example, an aqueous solution of a mixture of nitric and hydrofluoric acids.

After the surface of the fuel slug is cleaned, it may then be washed free of the cleaning agent, dried, and canned, as previously described.

One technique for carrying out the method of the present invention comprises wholly enclosing the cleaned slug within the can, as previously described, the end caps being secured in place around the can before the hydriding operation is carried out. Hydriding is then effected, preferably in accordance with the method more particularly set forth in United States Patent No. 3,070,526. In this connection, the canned slug is placed in a controlled environment within a heating furnace. Preferably, the controlled environment comprises a relatively high vacuum, for example, not more than about 1 micron of mercury. The controlled atmosphere should be as free as possible of the indicated contaminants. The furnace may comprise, for example, a conventional mullite furnace tube slightly larger than the canned fuel slug.

The temperature of the canned fuel slug is then increased to a pre-selected hydriding temperature between about 700° and 900° C. Purified hydrogen is then added to the apparatus to provide a hydrogen pressure of a pre-selected value, so that the hydriding rate does not exceed that rate provided by a hydrogen pressure at that temperature equal to the dissociation pressure of the beta solid solution of zirconium in a completely contaminant-free system containing an uncanned fuel slug. Such a hydrogen pressure can be readily determined by reference to FIGURES 1 and 2 of the accompanying drawings. FIGURE 1 is a graph plotting hydrogen concentration against temperature in a zirconium-hydrogen system, and FIGURE 2 is a graph plotting hydrogen concentration against hydrogen pressure for the same system. It has been found that purified hydrogen, i.e., hydrogen scavenged by passing over a suitable getter, such as Zr powder or chips, is in order to allow a sufficiently rapid hydriding rate and to facilitate hydriding to a high atomic ratio of hydrogen to zirconium.

The purified hydrogen passes through the can wall at the hydriding temperature and effects hydriding of the zirconium. The hydriding rate is limited by the resistance of the can and slug to passage of hydrogen therethrough. This limit will somewhat vary, depending on the thickness and type of can, the oxide film on the can and slug, etc. Usually, it is suitable to provide hydrogen in the system outside the can at atmospheric pressure, the indicated factors thereupon limiting the hydriding rate to a safe level, so that appreciable formation of zirconium hydride in a higher phase than the beta phase, i.e., the gamma phase or gamma plus beta phase, does not occur before substantial completion of hydriding in the beta phase. If hydriding of the zirconium in the fuel slug were to take place to a substantial extent in the gamma plus beta phase or in the gamma phase before substantial completion of hydriding of the zirconium in the beta phase, there would be established in the zirconium a hydrogen gradient, resulting in a considerable differential expansion of the zirconium from area to area, due to the presence of two or more phases in the zirconium. This large differential expansion would have a pronounced tendency to bring about cracking of the fuel slug, a condition to be avoided.

Utilizing a canned fuel slug, the rate of hydrogen flow into the zirconium of the slug is controlled during hydriding to provide a hydriding rate in accordance with the foregoing criteria. Inasmuch as there are normally present in the system some contaminants which have a tendency to decrease the hydriding rate, it is usual to provide in contact with the zirconium within the slug, a hydrogen pressure somewhat in excess of the dissociation pressure of the beta solid solution of zirconium which is for a contaminant-free system during hydriding of zirconium in the beta phase. Thus, the hydrogen pressure in contact with the zirconium pressure can usually exceed such dissociation pressure by about 100 mm. Hg.

It is desirable to continue hydriding the zirconium in the canned fuel slug until a relatively high ratio of hydrogen to zirconium is obtained. After the desired amount of hydrogen has been absorbed by the canned fuel slug in the beta and then in beta plus gamma and gamma regions, the system can be allowed to cool. The hydrogen remaining in the hydriding chamber and coming in contact with the hydride of the slug not exceeding the equilibrium dissociation pressure for the composition desired at the temperature existing at any given time in the canned slug during cooling. Successful hydriding of stainless steel canned uranium-zirconium-containing fuel slugs has been accomplished by the indicated procedure.

Hydriding according to the described technique is usually relatively slow, since the usual thicknesses and types of canning materials employed plus the presence of oxide films thereon and on the fuel slugs result in resistance to the passage of hydrogen into the slugs. Accordingly, the described technique usually requires a relatively extended hydriding time, for example, up to 4 or more days, in order to hydride the zirconium in the fuel slug to a hydrogen-to-zirconium atom ratio of, for example, about 1.7:1.0. However, such technique has the advantage that the rate of addition of hydrogen to the slug is ordinarily sufficiently slow so that no problems of excessively rapid hydriding are usually encountered. Thus, the system is in a sense self-regulating, and hydrogen at atmosphere pressure can usually be maintained around the canned slug in the hydriding chamber in all stages of hydriding.

It will be understood that, in view of the relatively long treatment period required to effect substantial hydriding of the zirconium by the described first technique, in certain circumstances, particularly where a relatively high hydrogen-to-zirconium atom ratio in a short period of time is desired, other techniques for carrying out the method of the present invention are indicated.

In this connection, the first described technique can be basically adhered to, but the hydriding rate for the same materials including the same type of can with oxide coating thereon, etc., can be substantially increased in accordance with the second technique, as described, hereinafter.

Thus, the fuel slug before hydriding and after cleaning is placed in the sleeve of the can. The can and slug are dimensioned so as to have a relatively greater initial diameter than the final diameter desired. In addition, they have a somewhat shorter length. The clearance between the sleeve and the side wall of the slug may be about the same as previously described. As with the previous technique, the slug is wholly enclosed within the can, the end caps for the can being securely fixed in place, as by welding, etc. Then in accordance with the second technique, the wholly canned slug is swaged, i.e., so that the can and slug are elongated. The elongation operation can be applied in accordance with conventional swaging procedures and has the effect of decreasing the diameter of the fuel slug and container and of lengthening the fuel slug and container. The clearance between the slug and can usually is decreased to about, for example, 5 mils. The swaging operation has the important function of breaking up the continuous oxide coating on both the can and the slug, thus providing for the can and slug points through which hydrogen can easily pass during the subsequent hydriding operation. It has been found that, for example, for most purposes, an elongation of the slug and can of about 10 percent is sufficient to satisfactorily break up the oxide film both on the fuel slug itself and on the can surfaces, so that hydriding will proceed at a much more rapid rate than can be obtained for the same materials by the first described technique.

In accordance with the second technique, hydriding is then carried out, preferably according to the procedure specified in United States Patent No. 3,070,526, and described above in connection with the first technique. With the second technique it has been further found that, for example, hydriding to a hydrogen-to-zirconium atom ratio of 1.0:1.0 can be accomplished in one or two days, for example at about 800° C. and that hydriding to a hydrogen-to-zirconium atom ratio of 1.7:1.0 at 760° C. can be accomplished in not more than about three days, in contrast to the more extended hydriding technique. Moreover, the hydriding rate is still limited by the discontinuous oxide films and the canning material. Accordingly, it has been found that with the usual canning materials and fuel slugs, the system is still self-regulating, as with the first technique. Thus, purified hydrogen stripped of contaminants, as by passing over zirconium, can usually be maintained in the hydriding chamber outside the swaged can at about atmospheric pressure throughout hydriding and subsequent cooling. The swaged can and slug still resist the passage of hydrogen into the slug to a sufficient extent to prevent excessively rapid hydriding of the zirconium, with consequent cracking of the slug.

For certain purposes, however, it is desirable to employ a third technique which differs slightly from the first two described techniques, in carrying out the method of the present invention. In accordance with the third technique, the fuel slug is placed in the can sleeve, as described with the first technique, and no swaging is carried out. However, the end caps for the can are not secured to the sleeve before hydriding. Instead, the hydriding is carried out with the fuel slug in the sleeve and exposed at the ends of the sleeve. Hydrogen during the hydriding enters the fuel slug from the exposed ends and also passes around the side wall of the fuel slug into the gap between that side wall and the side wall of the sleeve so as to come into contact with all surfaces of the slug. Furthermore, some hydrogen enters into contact with the fuel slug directly though the can sleeve. As the hydriding proceeds, and the fuel slug swells due to formation of zirconium hydride, the space or gap between the slug and sleeve wall ultimately decreases to essentially zero, hydriding thereupon proceeding only by passes of hydrogen into the slug at the exposed ends of the slug and through the sleeve wall.

Inasmuch as the fuel slug is at all times during the hydriding, directly exposed to hydrogen, it is preferred in carrying out the third technique to employ a hydriding procedure such as that set forth in United States Patent No. 3,135,697.

After the hydriding is completed, the end caps of the can are securely welded in place to provide the finished canned fuel slug.

The process of Patent No. 3,135,697 is similar to that of Patent No. 3,070,526 but calls for the introduction of hydrogen in small, controlled increments during the hydriding of zirconium. Moreover, hydriding is ultimately completed at the hydriding temperature selected in the gamma zirconium phase, after careful hydriding is carried out in the beta and the beta plus gamma phases.

After completion of hydriding in the gamma phase, additional hydriding of zirconium is accomplished in the gamma phase by introducing hydrogen in small increments into contact with the partially canned fuel slug while cooling the partially canned fuel slug in stages, e.g., in 30° C. spaced increments. Inasmuch as the maximum concentration of hydrogen which can be introduced into the zirconium in the gamma zirconium phase is greater at lower temperatures, increased hydriding of the zirconium during the cooling stages can thereby be accomplished.

However, in accordance with the method of Patent No. 3,135,697, after the hydriding is completed in the gamma zirconium phase during part of the cooling procedure, and before a sufficient amount of hydrogen has been introduced to form zirconium hydride having a hydrogen-to-zirconium ratio of 2:1, the hydriding is terminated by evacuating the reaction zone and thereafter cooling the partially canned fuel slug to room temperature. It has been found that in cases where the hydride is allowed to proceed to the indicated 2:1 hydrogen-to-zirconium raito, cracking of the zirconium-hydride is likely to occur, zirconium-hydride thus formed readily breaking down into a powder. Crack-free, unbroken pieces of zirconium-uranium alloy in the can sleeve have been provided in accordance with the method of Patent No. 3,135,697 containing zirconium-hydride in a ratio of hydrogen-to-zirconium as high as about 1.85:1.

In carrying out the third technique by the described accordance with the method of Patent No. 3,135,697 the zirconium of the fuel slug can be brought to a hydrogen-to-zirconium atom ratio of up to 1.8:1 in as few as three days of treatment time. Although it is preferred that the described third technique be carried out utilizing the method of Patent No. 3,135,697 either of the above indicated hydriding procedures can be used with the three techniques for carrying out the method of the present invention to provide canned fuel containing a crack-free nuclear fuel-metal hydride mixture with the hydride having a high hydrogen-to-metal ratio. It would be readily understood that whatever hydriding procedure is utilized in connection with the third technique, the hydriding rate must be carefully controlled to prevent cracking, inasmuch as the ends of the fuel slug and also the side walls are directly exposed to the hydrogen.

During the hydriding carried out in accordance with any of the above, no bowing or dimensional distortion of the canned or partially canned fuel slug occurs, if the canning material is suitably selected for structural stability, i.e., stainless steel or the like, and if there is a sufficient initial clearance between the fuel slug and the can wall. The fuel slug, due to the absorption of hydrogen, increases in size. The size increase can be readily predetermined, and the initial clearance between the fuel slug and the can wall can be regulated accordingly, so that a tight interference fit between the fuel slug and can may be brought about by the hydriding procedure without damage to the fuel slug or can. Such interference fit provides improved heat transfer from the fuel slug through the can to the coolant when the fuel element is placed in a nuclear reactor core.

Upon completion of the indicated hydriding procedure, no further processing of the canned fuel slug is necessary, except that as indicated above, in the case of the described third technique, the end caps of the can are secured in place on the can, as by welding, etc.

*Example I*

A zirconium-uranium alloy fuel body in the form of a cylindrical rod approximately 14″ long, approximately 1.5″ in diameter and having a 0.25″ diameter hole extending longitudinally through the center thereof is prepared from a particulate mixture of approximately 92 percent by weight of zirconium and approximately 8 percent by weight of uranium which has been melted to form an alloy. The rod is cleaned by immersing in trichlorethylene and abrading the surface thereof with steel wool while immersed. The rod is further cleaned by etching in an aqueous solution containing about 49 percent by volume of nitric acid and 1 percent by volume of hydrofluoric acid. The rod is then rinsed with alcohol and air-dried.

The rod is then placed within a closely fitting stainless steel sleeve fabricated of 20 mil thick type 304, 18–8 austenitic stainless steel dimensioned to provide a 10 mil clearance between the rod surface and the adjoining surface of the sleeve. End caps fabricated of the sleeve material are then welded on the top and bottom of the sleeve so as to wholly enclose the rod in the metal container.

The canned rod is then placed in a molybdenum boat formed from a sheet of clean molybdenum which has been cut to size and roll bent. It is then loaded into a mullite tube which is closed at one end and fused to a pyrex glass adapter. The mullite tube has a taper at the opposite end to which is connected to Pyrex end cap and a valved port for a vacuum and a hydrogen train. A cermaic shield is inserted in front of the rod before sealing the reaction chamber.

The reaction chamber comprising the sealed mullite tube with the rod therein is then sealed and loaded into an electric furnace and a vacuum-hydrogen train is connected to the vacuum-hydrogen line of the tube. The reaction chamber is then evacuated by means of a vacuum pump cut in on the line. The evacuation is continued to about 1 micron of Hg.

The canned fuel slug within the reaction chamber is then heated to about 760° C., the heating period taking place over approximately one hour, and after the indicated temperature is reached, the vacuum system is shut off and hydrogen which has been purified by passing it over zirconium is admitted to the reaction chamber at atmospheric pressure. During the course of the hydriding, the canned fuel slug is maintained in hydrogen at atmospheric pressure. The hydriding rate is solely controlled by the presence of oxide films on the surface of the slug and on the surfaces of the can, and by the thickness and nature of the canning material. The hydriding reaction is carried out over a period of approximately 4 days.

Inasmuch as the rate of entry of the hydrogen into the fuel slug through the can is slow, no special precautions need be taken when the temperature of the canned fuel slug is reduced from the hydriding temperature to room temperature, usually within about a 12 hour period, sufficiently slowly to prevent development of thermal stresses of the canned fuel slug but sufficiently rapidly to prevent substantial hydriding at lower temperatures than the indicated 760° C. hydriding temperature employed throughout the main portion of the hydriding procedure. After the slug is cooled to ambient temperature it is removed from the reaction chamber and examined.

The thus-treated canned rod is found to be crack-free, uniform in size and shape and tightly contained within the canning material. Moreover, the can does not exhibit dimensional distortion, i.e., no bowing, bending, etc., and no cracks or fissures. Upon testing the rod metallographically, it is found that hydrogen is uniformly distributed therethrough at a hydrogen-zirconium atom ratio of about 1.7:1.0. Thus, a finished, dimensionally accurate hydrided canned fuel body is provided which requires no further processing, such as drawing operations, machining, etc., before use in a nuclear reactor.

Example II

A zirconium-uranium alloy fuel rod with the same composition as set forth in Example I but having a length of approximately 12.6 inches and having a diameter of approximately 0.7 inch and having no hollow center, is disposed after cleaning in accordance with the procedures of Example I within a suitably dimensioned can of stainless steel which is 20 mils thick and of the 304, 18-8 austenitic type. The cam is dimensioned to provide a 10 mil clearance between the rod surface and the adjoining surface of the sleeve. The end caps are securely welded in place and the canned fuel rod is then swaged by passing it through conventional swaging equipment to draw out the can and rod to provide approximately 10 percent elongation, i.e., the swaged rod has a length of approximately 14 inches and a diameter of approximately 0.6 inch, with a very small (about 1 mil) clearance between the rod and can.

Hydriding is then carried out in the same manner and utilizing the same equipment as specified in Example I, including purified hydrogen at atmospheric pressure. However, hydriding is continued for three days at 760° C. and followed by cooling to ambient temperature over a 12 hour period. The canned fuel rod is then examined and found to have a hydrogen-to-zirconium atom ratio of approximately 1.7:1.

The swaging operation has the effect of decreasing the required treatment time at a given temperature to effect a given degree of hydriding. However, although the oxide film is broken up on both the stainless steel can and the uranium-zirconium rod, the hydriding rate is still sufficiently slow, due to the presence of the discontinuous oxide film and the thickness of the can, to allow the hydriding to take place in the presence of hydrogen at atmospheric pressure without danger of excessively rapid hydriding.

The canned rod after hydriding is found to have the characteristics essentially set forth for the finish hydrided canned fuel rod specified in Example I.

Example III

A zirconium-uranium alloy fuel rod having the same composition as set forth in Examples I and II and approximately the same length as the rod specified in Example I, but with a diameter of approximately 0.6 inch and having a solid center, is treated by hydriding it after it is cleaned, as per Example I, and inserted in a hollow sleeve of canning material, such as specified in Examples I and II. The end caps for the sleeve are not affixed in place before or during hydriding. There is an approximately 5 mil initial clearance between the rod side wall and that of the sleeve.

The hydriding is carried out in a reaction chamber having an internal diameter of 2 inches and an internal length of 24 inches, and other equipment substantially as called for in Example I, except that the hydriding rate is carefully controlled by the addition of purified hydrogen to the reaction chamber in small increments. Thus, after the reaction chamber is initially heated in a vacuum to 800° C., hydrogen which has been purified by passing it over a getter (zirconium) is introduced into the chamber in equally spaced increments of 0.09 cu. ft. for a total rate of 0.5 cu. ft. per hour over a period of about 48 hours.

After the hydriding at 800° C. is completed, the hydriding temperature is lowered to 760° C. and hydriding is again carried to completion in the gamma-zirconium phase, usually in less than 24 hours, to provide a hydrogen-to-zirconium atom ratio in the fuel slug of about 1.8:1.0. Subsequent hydriding can, if desired, be carried out in the reaction chamber at 720° C., 680° C., 560° C., and 520° C. or equivalent temperature stages, each stage being provided with controlled additions of hydrogen to the reaction chamber. At any rate, the reaction chamber after hydriding is completed is allowed to cool to 420° C. without further additions of hydrogen whereupon it is usually evacuated to about one micron of hydrogen pressure and then it is allowed to cool to ambient temperature.

The hydrided partially canned fuel slug is then removed from the reaction chamber, and the end caps for the can are welded to the can sleeve to provide a finished fully canned hydride fuel slug. The characteristics of the finished canned fuel slug are substantially as described in connection with the finished canned fuel slugs of Examples I and II.

The preceding examples clearly illustrate various advantages obtained by fabricating a canned fuel slug in accordance with the method of the present invention, wherein zirconium is hydrided in situ after at least partial canning of the fuel slug. The method is applicable to a wide variety of nuclear fuels and may be employed to hydride various metal alloys suitable for use as moderators with nuclear fuel. Various other types of metal canning material in addition to that specified in the examples can be used in preparing the finished canned fuel slug.

As indicated from the examples, the method is simple, economical and readily controllable to provide a desired hydrogen concentration in the fuel slug within the canning material. It does not require elaborate canning equipment or complicated fuel rod machining equipment. The method saves steps, in contrast to conventional processing of metal clad fuel elements, and also increases the safety factor during the manufacture of such fuel elements.

Further advantages of the present invention are set forth in the foregoing.

Various of the features of the present invention are set forth in the appended claims.

What is claimed is:

1. An improved method of fabricating a metal-clad fuel body containing a hydride, which method comprises the steps of forming a solid fuel body from a mixture of nuclear fuel and hydride-forming metal, providing a metal sheath around at least one surface of said fuel body, said metal sheath being structurally stable at a hydriding temperature between about 700° C. and about 900° C. and permeable to hydrogen at said hydriding temperature, said metal sheath being applied to said fuel body in a manner to provide an interference fit with said fuel body after hydriding, hydriding said hydride-forming metal of said fuel body with said metal sheath applied therearound at said hydriding temperature by passing hydrogen purified of hydride-rate depressing contaminants into contact therewith, controlling the hydriding rate so as to prevent excessive cracking of said fuel body, maintaining said hydrogen in contact with said fuel body until a desired degree of hydriding has been effected, and then cooling the hydrided fuel body to ambient temperature to provide a hydride-containing fuel body having a metal sheath disposed partially therearound.

2. An improved method of fabricating a metal-clad fuel body containing zirconium hydride, which method comprises the steps of forming a solid fuel body from a mixture of nuclear fuel and zirconium, wholly enclosing said fuel body in a metal container, the metal of said container being structurally stable at a hydriding temperature between about 700° C. and about 900° C. but permeable to hydrogen at said hydriding temperature, said container being dimensioned to provide an interference fit with said fuel body after hydriding, hydriding said zirconium in situ in said container at said hydriding temperature by passing hydrogen purified of hydriding rate depressing contaminants into contact with said container and maintaining said hydrogen in contact with said container until a desired degree of hydriding of said zirconium is effected, and thereafter cooling said fuel body and container to ambient temperature to provide a finished zirconium hydride-containing fuel body having a closely fitting closed metal container disposed therearound.

3. An improved method of fabricating a metal-clad fuel body containing zirconium hydride, which method comprises the steps of forming a solid fuel body from a mixture of nuclear fuel and zirconium, cleaning said fuel body to remove hydriding rate depressing contaminants therefrom, wholly enclosing said cleaned fuel body in a metal container, the metal of said container being structurally stable at a hydriding temperature between about 700° C. and about 900° C. but permeable to hydrogen at said hydriding temperature, said container being dimensioned to provide an interference fit with said fuel body after hydriding, hydriding said zirconium in situ in said container at said hydriding temperature by passing hydrogen which has been purified of hydriding rate-depressing contaminants at about atmospheric pressure into contact with said container, and maintaining said hydrogen at about atmospheric pressure in contact with said container until a desired degree of said hydriding of said zirconium is effected, thereafter cooling said fuel body and container to ambient temperature to provide a finished zirconium hydride-containing fuel body having a closely fitting metal container disposed therearound.

4. An improved method of fabricating a metal-clad fuel body containing zirconium hydride, which method comprises the steps of forming a solid fuel body from a mixture of nuclear fuel and zirconium, wholly enclosing said fuel body in a metal container, the metal of said container being structurally stable at a hydriding temperature between about 700° C. and about 900° C. but permeable to hydrogen at said hydriding temperature, swaging said container and enclosed said fuel body to elongate the same a sufficient extent to interrupt the oxide film on the surfaces of said container and said fuel body, thereby facilitating hydriding of said zirconium, said container being dimensioned to provide an interference fit with said fuel body after hydriding, hydriding said zirconium in situ in said container at said hydriding temperature by passing hydrogen which has been stripped of hydriding rate depressing contaminants into contact with said container and maintaining hydrogen in contact with said container until a desired degree of hydriding is effected, and cooling said fuel body and container to ambient temperature to provide a finished zirconium hydride-containing fuel body having a closely fitting closed metal container disposed therearound.

5. An improved method of fabricating a metal-clad fuel body containing zirconium hyride, which method comprises the steps of forming a solid fuel body from a mixture of nuclear fuel and zirconium, cleaning said fuel body to remove hydriding rate depressing contaminants therefrom, sealing said cleaned fuel body in a closed metal container, the metal of said container being structurally stable at a hydriding temperature between about 700° C. and about 900° C. but permeable to hydrogen at said hydriding temperature, swaging said container with the fuel body enclosed therein to elongate said fuel body and said container at least about 10 percent, thereby disrupting the film of oxide on the surfaces of said container and said fuel body so as to facilitate subsequent hydriding of said zirconium, said container being dimensioned to provide an interference fit with said fuel body after hydriding, hydriding said zirconium in situ in said container at said hydriding temperature by passing hydrogen which has been stripped of hydriding rate depressing contaminants at about atmospheric pressure into contact with said container and maintaining said hydrogen in contact with said container at about atmospheric pressure until desired hydriding of said zirconium is effected, and cooling said fuel body and container to ambient temperature to provide a finished zirconium hydride-containing fuel body having a closely fitting closed metal container disposed therearound.

6. An improved method of fabricating a metal-clad fuel body containing zirconium hydride, which method comprises the steps of forming a solid fuel body from a mixture of nuclear fuel and zirconium, enclosing only the side wall of said fuel body in a sleeve fabricated of metal structurally stable at a hydriding temperature between about 700° C. and about 900° C. but permeable to hydrogen at said hydriding temperature, the ends of said fuel body being left unenclosed, said sleeve being dimensioned to provide an interference fit with said fuel body after hydriding, hydriding said zirconium in situ in said metal sleeve at said hydriding temperature by passing hydrogen which has been stripped of hydride rate depressing contaminants in controlled concentrations into contact with said container, and maintaining said hydrogen in contact with said fuel body until desired hydriding of said zirconium is effected, cooling said fuel body and container to ambient temperature, and sealing the ends of said sleeve shut with metal to provide a finished zirconium hydride-containing fuel body having a closely fitting closed metal container disposed therearound.

7. An improved method of fabricating a metal-clad fuel body containing zirconium hydride, which method comprises forming a solid fuel body from a mixture of nuclear fuel and zirconium, cleaning said fuel body to remove hydriding rate depressing contaminants therefrom, disposing said cleaned fuel body in a sleeve fabricated of metal structurally stable at hydriding temperature of from 700° C. to about 900° C. but permeable to hydrogen at said hydriding temperature, the ends of said fuel body being unenclosed, said sleeve being dimensioned to provide an interference fit with said fuel body after hydriding, hydriding said zirconium in situ in said sleeve at said hydriding temperature by passing hydrogen which has been stripped of hydriding rate depressing contaminants into contact with said sleeve in controlled concentrations, maintaining said hydriding temperature together with a hydrogen pressure just sufficient to effect hydriding of zirconium to substantial completion in a given zirconium hydride phase before substantial hydriding of said zirconium in the next successive zirconium hydride phase, completing hydriding of said zirconium at said temperature, thereupon lowering the hydriding temperature and continuing hydriding to provide zirconium hydride in said fuel body having a desired hydrogen to zirconium atom ratio, cooling said fuel body and sleeve to ambient temperature, and sealing the ends of said sleeve with metal to provide a finished zirconium hydride-containing fuel body having a closely fitting closed metal container disposed therearound.

8. An improved method of fabricating a metal-clad fuel body containing zirconium hydride, which method comprises the steps of forming a solid fuel body from a mixture of nuclear fuel and zirconium metal, cleaning said fuel body so as to remove hydriding rate depressing contaminants therefrom, disposing said cleaned fuel body in a loosely fitting sleeve fabricated of metal which is structurally stable but which is permeable to hydrogen at a hydriding temperature between about 700° C. and about 900° C., the ends of said fuel body being left unenclosed, said sleeve being dimensioned to provide an interference fit with said fuel body after hydriding of said zirconium, placing the fuel body with said sleeve therearound in a hydriding zone, evacuating said zone and increasing the temperature of said fuel body to said hydriding temperature, introducing hydrogen, which has been stripped of zirconium hydride rate depressing contaminants by passage over zirconium, into contact with said sleeve and said fuel body in controlled amounts, and maintaining said hydriding temperature and a hydrogen pressure in said zone just sufficient to effect hydriding of said zirconium to substantial completion in a given zirconium hydride phase before substantial hydriding of said zirconium in the next successive zirconium hydride phase, completing hydriding of said zirconium at said temperature in the gamma zirconium phase, lowering the temperature of said fuel body while introducing additional amounts of said purified hydrogen into contact with said sleeve, whereby hydriding of said zirconium in the gamma zirconium phase is continued, and terminating said hydriding at a hydrogen-to-zirconium atom ratio of less than 2:1, evacuating the hydriding zone, and cooling the fuel body and sleeve to ambient temperature, then sealing the exposed ends of said sleeve with metal to provide a finishing hydrided fuel body having a closely fitting closed metal container disposed therearound.

References Cited in the file of this patent

UNITED STATES PATENTS 2,824,620    Rosset _____ Feb. 25, 1958

OTHER REFERENCES

Nuclear Fuel Elements, Hausner et al., November 1959, pp. 80–82 and 239.

2nd Geneva Conference on Atomic Energy, September 1958, pp. 111–115.

AEC Document BMI 1244, Unclassified April 1958, pp. 5.